March 17, 1970  W. L. MORSE  3,500,495
FISH HOLDING APPARATUS
Filed Jan. 15, 1968
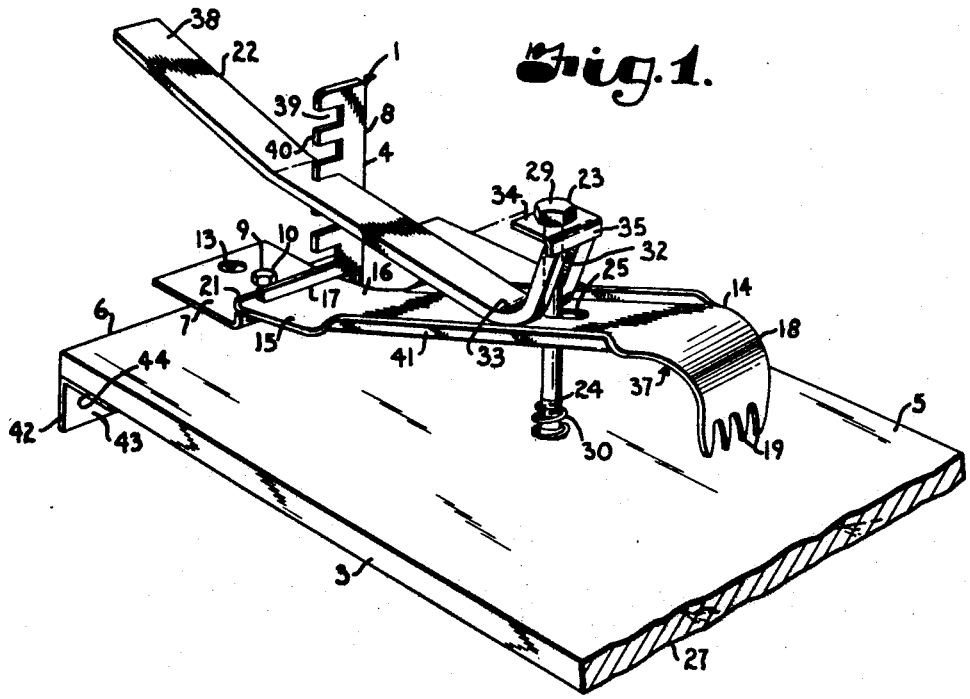
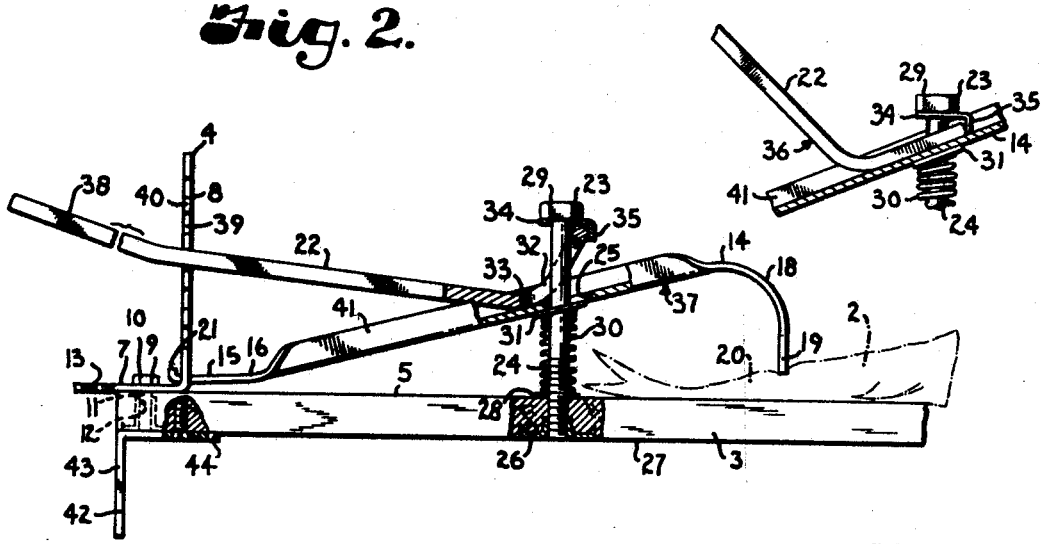
INVENTOR.
WILLIAM L. MORSE
BY
ATTORNEYS

United States Patent Office 3,500,495
Patented Mar. 17, 1970

3,500,495
FISH HOLDING APPARATUS
William L. Morse, 7526 E. 85th St.,
Kansas City, Mo. 64138
Filed Jan. 15, 1968, Ser. No. 697,704
Int. Cl. A22c 25/06
U.S. Cl. 17—70
7 Claims

ABSTRACT OF THE DISCLOSURE

Fish holding apparatus mounted on a fish supporting work surface having a support member mounted adjacent one edge of the work surface for retaining one end of a clamping member having a jaw portion on the other end for engaging a portion of a fish. A cam lever is operative to move the clamping member toward and away from the work surface. An upright portion of the support member has spaced notches along one edge for receiving a handle portion of the cam lever thereby maintaining the jaw portion in a selected spaced relation with the work surface while engaging a portion of the fish in clamping engagement.

---

Scaling or skinning of fish is not only an unpleasant task, but also may be quite troublesome because of the difficulty of holding a slipery fish while preparing same for use as food therefore it is preferable to have both hands free for the operation.

The principal objects of the present invention are: to provide a fish holding apparatus formed of a few simple parts which can be quickly operated to clampingly engage a portion of a fish; to provide such apparatus adapted to receive a large range of sizes of fish; to provide such fish holding apparatus which is portable and adapted to be mounted on support structures such as field tables, tree strumps, work benches, dock surfaces, and the like; and to provide an improved fish holder which is strong, durable, compact, net in appearance, simple to operate, sanitary in use, and which is well adapted for the purposes described.

Other objects and advantages of this invention will become apparent from the following description taken in connection with the accompanying drawings wherein are set forth by way of illustration and example certain embodiments of this invention.

FIG. 1 is a perspective view of fish holding apparatus embodying the features of the present invention.

FIG. 2 is a side elevational view of the fish holding device with portions broken away to better illustrate the component parts.

FIG. 3 is a partial elevational view showing a cam lever in a relaxed position.

Referring more in detail to the drawings:

The reference numeral 1 generally designates a fish holding apparatus which is portable and particularly adapted for field preparation of fish 2 for use as food such as scaling, skinning, evisceration, cleaning and filleting.

The fish holding apparatus 1 includes a suitable plate-like member 3 preferably of a suitable waterproof material, as for example waterproof hard board, plastic and the like.

A support and latch member 4 is mounted on an upper surface 5 of the board or plate-like member 3 preferably adjacent one edge 6 of said plate-like member 3. In the illustrated structure the support member 4 consists of a base portion 7 which rests on the upper surface 5 and an upstanding portion 8 extending upwardly therefrom and substantially perpendicular to the upper surface 5.

A suitable fastening device, such as a bolt 9 secures the support member 4 to the plate-like member or board 3.

A bolt head 10 engages the base portion 7 while the shank 11 is threaded into a hole 12 in the board 3. The base portion 7 extends beyond the board 3 and has a hole or opening 13 whereby the structure may be hung on a suitable support or hanger (not shown) when not in use.

A clamping member 14 has one end 15 pivotally or otherwise hingedly connected to the support and latch member 4. In the illustrated structure the clamping member 14 has a tongue 16 extending through a slot 17 in the support and latch member 4 to form the hinge. The tongue 16 is at one end and the other end has a jaw portion 18 with a plurality of teeth 19 adapted to engage a portion of the fish 2, as for example a tail portion 20 and retain same in clamping engagement with the upper surface 5.

The slot 17 is in the upstanding portion 8 adjacent the board 3 with the tongue 16 extending therethrough and terminating in a flange 21 to prevent the clamping member from being pulled therefrom. This positions the clamping member 14 in spaced relation to the board 3.

A lever 22 is operative to move the jaw portion 18 toward the upper surface 5 of the board 3 for clamping engagement with the tail portion 20 of a fish 2 and retain same in clamped or gripped engagement. In the illustrated structure a suitable shaft or guide device, such as a bolt 23, guides the clamping member 14 and the lever 22 during movement to said clamping engagement and has a threaded shank 24 extending through an elongate slot 25 in the clamping member 14. One end of the threaded shank 24 is suitably secured to the plate-like member 3 as by extending therethrough and being mounted in a keeper 26 secured in a lower surface 27 of the plate-like member 3. A lock member such as a T-nut 28 is threaded on the shank 24 and engages the upper surface 5 of the board 3 to lock the shank 24 in selected position. A head 29 on an opposite end of the threaded shank 24 limits the travel of the clamping member 14, as later described.

A suitable resilient member, such as a helical compression spring 30, is operative to bias the clamping member away from the upper surface 5. In the illustrated structure, the spring 30 is sleeved on the threaded shank 24 and opposite ends of the spring 30 engage the T-nut 28 and a suitable washer 31 positioned to engage the clamping member 14 respectively. The spring 30 thereby urges the clamping member 14 toward the head 29.

The elongate lever 22 is positioned above the clamping member 14 with the bolt 23 extending through an elongate slot 32 in a cam portion 33 at one end of the lever 22. An abutment member 34 having a depending lip 35 is positioned to be engaged by one end of the cam portion 33 during movement of the cam portion 33 from a relaxed position 36 as best illustrated in FIG. 3 to a clamping position 37 as best illustrated in FIGS. 1 and 2. When the cam portion 33 is in the relaxed position 36 the jaw portion 18 is positioned away from the upper surface 5 or in an open position.

In the illustrated structure the abutment member 34 is positioned on the bolt 23 immediately below the head 29. The lever 22 is positioned above the clamping member 14 and the abutment member 34 is positioned above the cam portion 33 of the lever 22 whereby the one end of the cam portion 33 engages the depending lip 35 and the cam portion 33 engages the clamping member 14 at a surface opposite the surface engaged by the washer 31 while the handle portion 38 is moved toward the upper surface 5.

A handle portion 38 of the lever 22 provides leverage for the movement of the cam portion 33 between the relaxed position 36 and the clamping position 37. The handle portion 38 is adapted to be inserted in one of a plurality of slots or notches 39 spaced along one edge 40 of the upstanding portion 8 of the support and latch member 4 thereby retaining the jaw portion 18 in a selected spaced relation with the upper surface 5 or in clamping engagement with the tail portion 20 of the fish 2.

Longitudinal edges 41 of the clamping member 14 are upturned and positioned to be engaged by the cam portion 33 for limiting lateral or rotary movement of the cam portion 33 about the bolt 23 during insertion of the handle portion 38 in a selected notch 39. The upturned edges 41 also retain the cam portion 33 of the lever 22 in relative alignment with the clamping member 14 during movement of the clamping member 14 toward the upper surface 5 by the lever 22.

A suitable edge or stop member, such as an angle 42 is mounted along the one edge 6 of the plate-like member 3 and has a depending leg 43 positioned to engage an edge of a suitable support surface, such as field tables, tree stumps, dock surfaces, work benches and the like (not shown), on which the fish holding apparatus 1 may be placed for preparation of the fish 2 retained thereon. In the illustrated structure, the angle 42 has the other leg 44 secured to the lower surface 27 of the plate-like member 3 by suitable fastening devices such as screws.

In operation the tail portion 20 of the fish 2 is positioned to be engaged by the jaw portion 18. Pressure is exerted on the handle portion 38 to move the cam portion 33 of the lever 22 from the relaxed position 36 to the clamping position 37 thereby moving the jaw portion 18 into clamping engagement with the tail portion 20. The handle portion 38 is moved sidewardly as by rotating about the bolt 23 to be engaged within one of the notches 39 thereby retaining pressure on the spring 30. When it is desired to remove the fish 2 from the fish holding apparatus 1, the handle portion 38 is removed from the selected notch 39 and the spring 30 is allowed to urge the clamping member 14 and the lever 22 upwardly and away from the upper surface 5.

It is preferable that the metal parts or at least the jaw portion 18 be stainless steel, cadmium plated or otherwise suitably treated to not contaminate the fish and to be easily cleaned after use.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. Holding apparatus comprising:
   (a) a base member for resting on a support;
   (b) a standard mounted on said base member adjacent one edge of said base member;
   (c) a clamping member having one end mounted relative to said standard for swinging movement of said clamping member toward and away from said base, said clamping member having a jaw portion on the other end;
   (d) an abutment member positioned above said base member;
   (e) a lever between said abutment member and said clamping member, said lever having a cam portion at one end and a handle portion at the other end, said cam member engaging said abutment member and said clamping member to swing said clamping member toward said base member to clamp an object between the jaw portion and the base member;
   (f) means biasing said clamping member away from base member;
   (g) retaining means on said standard and having an upstanding portion with a plurality of spaced notches along one edge for receiving said handle portion of the lever therein whereby said jaw portion of the clamping member is retained in a selected clamping engagement with said object;
   (h) an elongate slot in said cam portion, said slot extending longitudinally of said lever;
   (i) an elongate slot in said clamping member intermediate the ends thereof and extending longitudinally of said clamping member and substantially aligned with the slot in the cam portion;
   (j) an elongate guide device mounted on the base member and extending through said elongate slot in said clamping member and through said elongate slot in said cam portion;
   (k) said abutment member being on the guide device and having a depending lip portion positioned to be engaged by one end of said cam portion; and
   (l) said biasing means being a resilient member associated with said guide device, said resilient member engaging said base member and said clamping member.

2. The holding apparatus as set forth in claim 1 including:
   (a) said clamping member having upturned longitudinal edges extending between said hinged end and said jaw portion for limiting lateral movement of said cam portion about said guide device to that necessary for engaging said handle portion in said respective notch.

3. Fish holding apparatus comprising:
   (a) a plate-like base member for resting on a support;
   (b) a hinge standard mounted adjacent one edge of said base member;
   (c) a clamping member having one end hingedly connected to said hinge standard and a jaw portion at the opposite end thereof, said clamping member having a longitudinally aligned elongate slot intermediate its ends, said jaw portion being movable toward and away from said base member;
   (d) an elongate guide shaft having one end secured to said base member and extending upwardly therefrom and through said slot in said clamping member;
   (e) a resilient member sleeved on said elongate guide shaft and having opposite ends engaging said base member and said clamping member respectively whereby said clamping member is urged away from said base member by said resilient member;
   (f) an abutment member positioned above said clamping member and having a depending lip portion;
   (g) an elongate lever having a cam portion at one end and a handle portion at the other end, said cam portion having an elongate slot therein longitudinally of said lever with said elongate shaft extending through said slot in said cam portion;
   (h) said cam portion engaging said abutment member lip portion and said clamping member to effect movement thereof in response to movement of said handle portion toward said base member; and
   (i) said standard having an upstanding portion with a plurality of spaced notches along one edge and extending therein transversely to said handle portion for receiving said handle portion therein whereby said clamping member jaw portion is retained in a selected position.

4. The fish holding apparatus as set forth in claim 3 wherein:
   (a) said elongate guide shaft has a head portion on an end spaced from said base member,
   (b) said abutment member being mounted on said guide shaft and engageable with said shaft head portion, and
   (c) said cam portion has an end engaging said abutment member lip portion whereby said cam portion is operative to move said jaw portion toward said base member when said handle portion is moved toward said base member.

5. The fish holding apparatus as set forth in claim 3 including:
   (a) said hinge standard having a base portion engaging said base member with a portion of said base portion extending outwardly from said base member one edge, and (b) said outwardly extending portion of said base portion having an opening for receiving a supporting member.

6. The fish holding apparatus as set forth in claim 5 wherein the hinge connection of the clamping member and hinge standard includes:
   (a) said hinge standard upstanding portion having an elongate slot substantially parallel with said base member,
   (b) said clamping member one end having a tongue received in said slot in said upstanding portion whereby said clamping member is spaced above said base member with movement of said clamping member being limited to movement toward and away from said base member,
   (c) said clamping member tongue having a flange at the end thereof for retaining same in said slot, and
   (d) said clamping member having upturned longitudinal edges extending between said hinged one end and said jaw portion for limiting lateral movement of said lever about said guide shaft and maintaining said lever in substantial longitudinal alignment with said clamping member.

7. Holding apparatus comprising:
   (a) a base member for resting on a support;
   (b) a standard mounted on said base member adjacent one edge of said base member;
   (c) a clamping member having a jaw portion on one end said clamping member being mounted relative to said standard for swinging movement of said jaw portion toward and away from said base,
   (d) an abutment member positioned above said base member;
   (e) a lever between said abutment member and said clamping member, said lever having a cam portion at one end and a handle portion at the other end, said cam member engaging said abutment member and said clamping member to swing said jaw portion toward said base member to clamp an object between the jaw portion and the base member;
   (f) means biasing said clamping member away from base member;
   (g) retaining means on said standard and having an upstanding portion with portions for engagement with said handle portion of the lever therein whereby said jaw portion of the clamping member is retained in a selected clamping engagement with said object;
   (h) an elongate slot in said cam portion, said slot extending longitudinally of said lever;
   (i) an elongate guide portion in said clamping member intermediate the ends thereof;
   (j) an elongate guide device mounted on the base member and slidably engaging said elongate guide portion in said clamping member and extending through said elongate slot in said cam portion;
   (k) said abutment member being on the guide device and having a depending lip portion positioned to be engaged by one end of said cam portion; and
   (l) said biasing means being a resilient member associated with said guide device, said resilient member engaging said base member and said clamping member.

References Cited

UNITED STATES PATENTS

| | | | |
|---|---|---|---|
| 1,259,109 | 3/1918 | Kugler et al. | 17—70 |
| 1,353,981 | 9/1920 | Bahde | 17—70 |
| 2,974,357 | 3/1961 | Berg | 17—70 |
| 3,016,565 | 1/1962 | Hill | 17—70 |

LUCIE H. LAUDENSLAGER, Primary Examiner